No Printed Specification Available
7115X
Burrall & Axtel,
Horse Power.
Patented June 13, 1832.
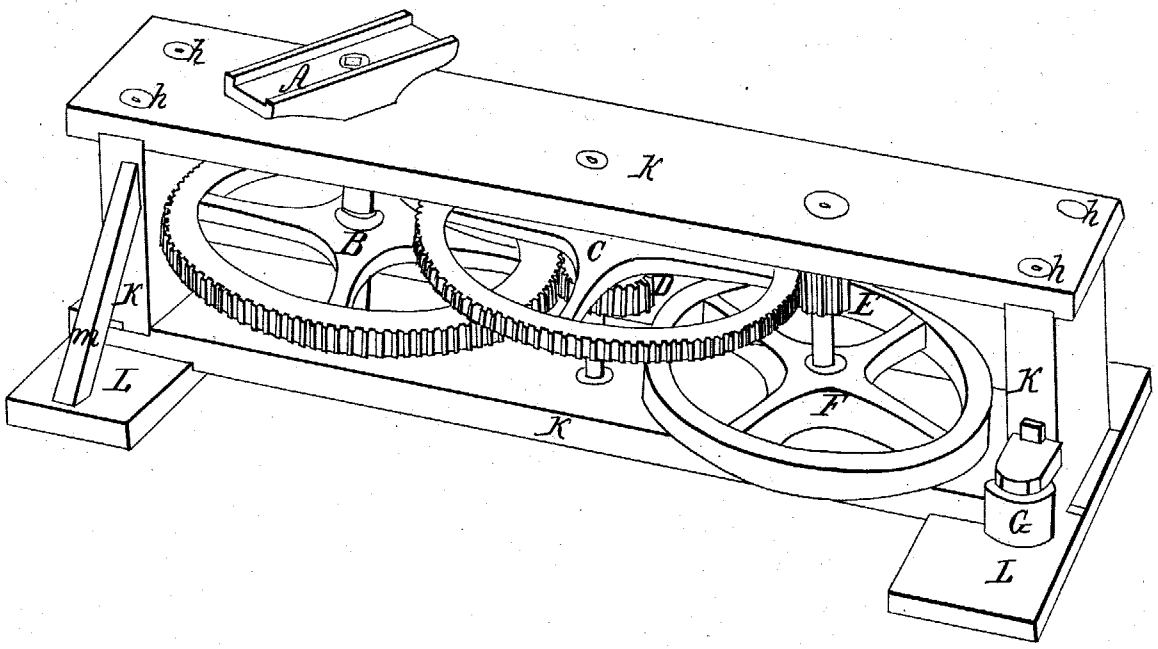
AM. PHOTO-LITHO. CO. N.Y. (OSBORNE'S PROCESS)

7115X June 13, 1832 1

Thomas D. Burrall & Jehial F. Axtell of Geneva
C of Ontario and State of Newyork Letters Patent The schedule referred to in these Letters Patent and making part
of the same, containing a description in the words of the said
Tho.s D Burrall and Jehial F. Axtell themselves, of their im-
provement in the machine for propelling Thrashing Machines
and other Machinery by horses or other animal power.

---

Be it known, that We, Tho.s D. Burrall & Jehial F. Axtell
of Geneva in the county of Ontario and State of Newyork have in-
vented a new and useful improvement in the machine for propel
ling Thrashing Machines and other machinery by horses or other
animal power; and that the following is a full & exact description
of the construction & operation of the machine for that purpose
as invented or improved by us. Viz:

It consists of a frame, composed of two cross sills of plank
14 inch.s wide 3½ inch.s thick & four feet long, placed parallel to
each other and about 6 feet apart: on the top of these is laid a
plank of similar dimensions about 8 feet long and let into the
cross sills by slight gains, on each end of this plank is raised a
head block 14 inch.s wide 6 inch.s thick & 12 inch.s high, resting on
the tops of these blocks is another plank of similar dimensions
of the bottom one, also let on to the head blocks by gains. Thro'
each of the head blocks are passed (perpendicularly) 2 strong
iron bolts with nuts and screws confining the top of the frame
to the cross sills, and thus binding the whole frame firmly togeth
without tenons or mortise.

In this frame is placed a horizontal cogwheel 3½ feet
diameter the foot of the shaft of which is stepped into the bot
tom piece of the frame. The upper end of the shaft passes thro' the
top piece of the frame by a neck & collar and on the head of the
shaft is secured a cast iron cap or trough fitted to receive a Drawing [illegible] } [illegible] a copy of [illegible] page
[illegible]

sweep or bar 10 feet long to which the horse or other power is to be
attached so as to travel around the machine in order to propel it,
This lever is to be secured to the cap or trough by screwbolts or bands At a suitable distance in the frame, from this wheel is plac
a second cog wheel of similar dimensions to the first with a pini
containing twenty teeth (more or less) upon its shaft, mashing
into the teeth of the first wheel - At a suitable distance from
this second wheel and as near as may be to the bottom of the fra
is placed a band wheel of the same dimensions to the shaft of wh
is also attached a pinion, containing 12 teeth more or less, mashing
into the teeth of the second wheel, thus giving a highly accelerated
motion to the band wheel. - On the side of the head block near
the bandwheel is affixed a pulley over which the band passes i
such a manner as to bring it nearly around the wheel before it lea
it, and thus bringing the returning part of it within a few inches of th
line of draft of the other part of it - Both parts then pass horizontally
in parallel lines thro' a box or trunk placed upon the ground on
which the Horses walk - At the outer end of this box (which may
be about 6 feet long) are placed 2 pulleys under which the two
parts of the band pass, by which means, the line of motion is
changed into any direction required - When applied to the thrashi
Machine, the whirr of the cylinder of the thrashing Machine is pl
directly over the pulleys, so that the band shall pass upwards
from one of the pulleys to the whirr and downwards from the
whirr to the other pulley, thus connecting the movements of the
horse power machine, with the Thrashing Machine without the
necessity of any additional fixtures or framework to set it up
so that the process of thrashing may be commenced at once by
means of it, in the field or the road without trouble or expense In this Machine, we claim the mode of connecting the powe
with the machinery to be propelled by means of the horizonta
band wheel and band under the horses feet, whether the band b
gathered into the box or trunk described by means of the pulley 7115x June 13, 1832 3 or passed under foot by two trunks or otherwise — And we also claim the peculiarly simple, strong and useful construction & combination of the frame of the horse power Machine as described above — In Testimony whereof that the above is a true specification of our said improvement as above described we have hereunto set our hands and seals this 20th day of March 1832.

Witnesses
Eurotas Hastings
James Wm. Handfield

Thos. D. Burrall
Jehial F. Axtell ([illegible])

[illegible]

[illegible] probably as on page 13

(Patented June 13. 1832.)